Patented Dec. 5, 1939

2,182,528

UNITED STATES PATENT OFFICE 2,182,528

STABILIZATION OF VINYL ACETATE

Gelu S. Stamatoff, Arlington, N. J., assignor to E. I. du Pont de Nemours & Company, Wilmington, Del., a corporation of Delaware No Drawing. Application July 29, 1938, Serial No. 222,068

3 Claims. (Cl. 23—250)

This invention relates to the stabilization of vinyl acetate and, more particularly, to the prevention of polymerization of vinyl acetate during storage and distillation.

An object of the present invention is to provide a simple, economical, and convenient means of preventing any appreciable polymerization of vinyl acetate during prolonged storage or during distillation of the same. A further object is to provide a polymerization inhibitor directly soluble in vinyl acetate without the assistance of a third substance as an intermediary. A still further object is to provide such a polymerization inhibitor which is not volatile at the temperature of distillation of the vinyl acetate and, hence, is readily separated completely from the vinyl acetate. Other objects of the invention will be apparent from the description given hereinafter.

The above objects are accomplished according to the present invention by adding to monomeric vinyl acetate to be stabilized a substance from the group consisting of rosin and the copper, zinc, magnesium, aluminum, and cobalt resinates. It is preferred to employ copper resinate as the inhibitor.

Those skilled in the art will appreciate that rosin of ordinary commercial grades, although a mixture of somewhat indefinite composition, is composed chiefly of abietic acid, approximately 80–90%, and the metal resinates of commerce are essentially abietates containing various impurities in varying but relatively small proportions. Since rosin and metal resinates of commercial grades are entirely satisfactory for the purposes of the present invention and considerably more economical than pure abietic acid or metal abietates, it is preferred to use them as a matter of economy and convenience.

The effectiveness of the herein considered substances as inhibitors or preventives of polymerization of vinyl acetate is demonstrated by the following test:

Monomeric vinyl acetate containing the inhibitor is placed in a flask fitted with a ground-joint glass condenser and boiled under reflux for 24 hours. The flask is them emptied into water which is boiled to expel unpolymerized monomer. The residue containing the inhibitor and any polymer formed is dried and weighed. By deducting the weight of the inhibitor from the weight of the residue, the weight of the polymer formed during the 24 hours heating is thus established.

Results with various inhibitors of the present invention in varying proportions are given in the table below, proportions being given by weight:

| Inhibitor added to monomer | | Percentage polymer formed in 24 hours of refluxing |
|---|---|---|
| Substance | Percentage | |
| Copper resinate | 0.1 | 0.002 |
| Do | 0.05 | 0.070 |
| Do | 0.015 | 0.092 |
| Do | 0.01 | 0.180 |
| Do | 0.005 | 2.25 |
| Do | 0.2 | 0.5 |
| Zinc resinate | 0.1 | 0.752 |
| Magnesium resinate | 0.2 | 1.14 |
| Aluminum resinate | 0.2 | 0.89 |
| Cobalt resinate | 0.2 | 0.35 |
| Rosin | 0.2 | 37.5 |
| Control batch | No inhibitor | |

It will be understood that the above proportions of inhibitor are merely illustrative and that the proportion of the inhibitor used in any particular instance will depend upon the conditions to which the monomer is to be exposed and upon the thoroughness of the inhibitory action required. During distillation, the percentage of inhibitor builds up as the volume of monomer in the flask or pot decreases.

Copper resinate is the preferred inhibitor and the amount of this substance required to prevent polymerization of vinyl acetate monomer during prolonged storage at temperatures up to 40° C. is of the order of 0.01% by weight of the vinyl acetate. The amount of copper resinate required to prevent appreciable polymerization during distillation at atmospheric pressure is of the order of 0.1%. With monomer containing unusually large amounts of aldehydes these proportions should be increased somewhat. The other substances will be used in greater proportions to obtain the same effect as can be deduced from a consideration of the table given above.

An advantage of the present invention is that the inhibitors are inexpensive and readily soluble in monomeric vinyl acetate in effective proportions, requiring no third substance to promote solution. Further, they are not volatilized with the vinyl acetate during distillation of the latter and are thus readily removed therefrom prior to any process of polymerizing the vinyl acetate. In addition, these substances are extremely effective inhibitors when present in only very small amounts.

As many apparently widely different embodiments of this invention may be made without departing from the spirit and scope thereof, it is to be understood that the invention is not limited to the specific embodiments thereof except as defined in the appended claims.

I claim:

1. Method of inhibiting polymerization of monomeric vinyl acetate which comprises adding thereto, in inhibitor amounts, a substance selected from the group consisting of rosin and the copper, zinc, magnesium, aluminum, and cobalt resinates.

2. Method of inhibiting polymerization of monomeric vinyl acetate which comprises adding thereto, in inhibitor amounts copper resinate.

3. Method of inhibiting polymerization of monomeric vinyl acetate which comprises adding thereto 0.01% to 0.1% of copper resinate by weight of the vinyl acetate.

GELU S. STAMATOFF.